INVENTOR
Francis T. Gianino
BY
Brown and Mikulka
and
James L. Neal
ATTORNEYS

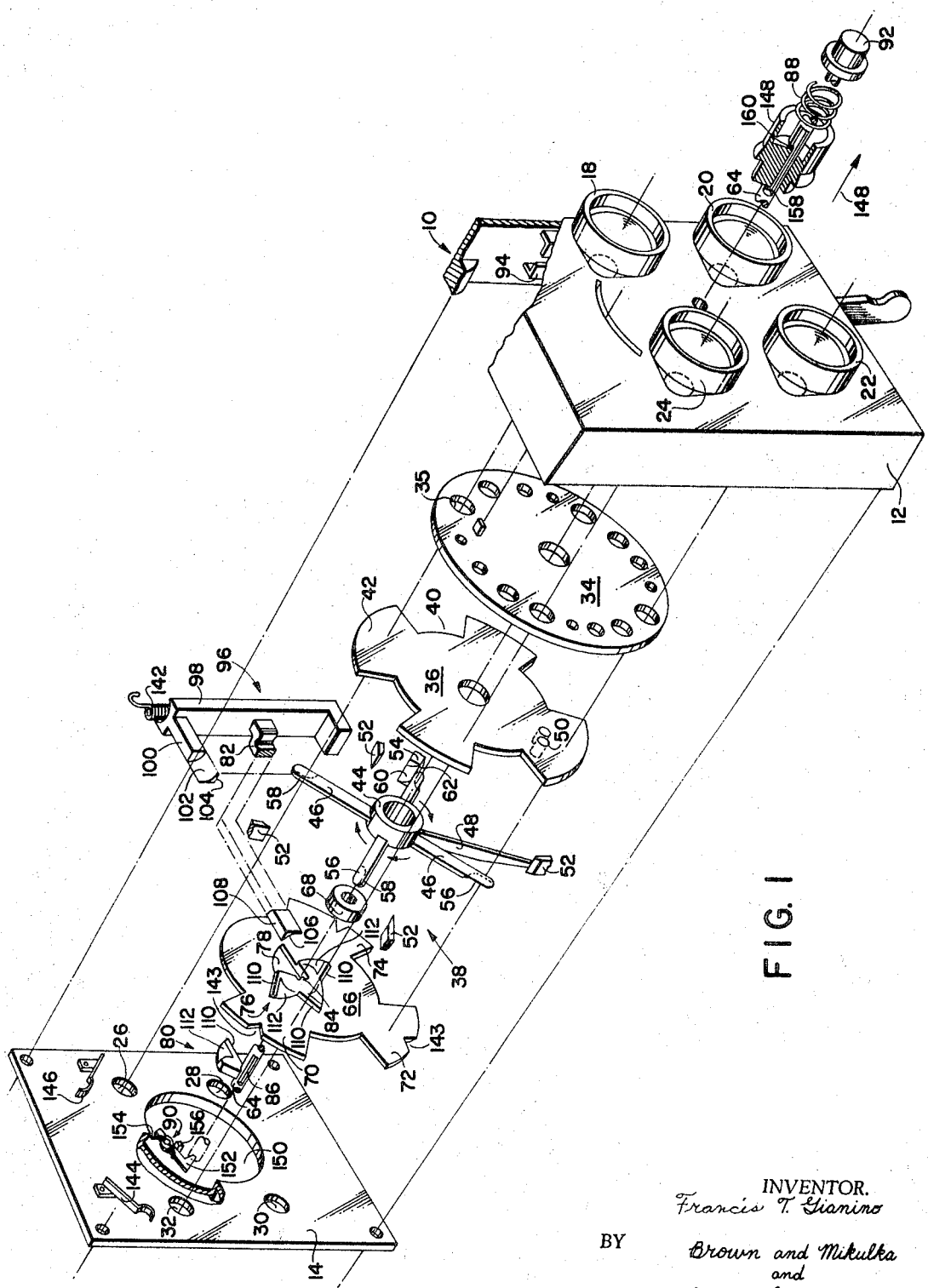

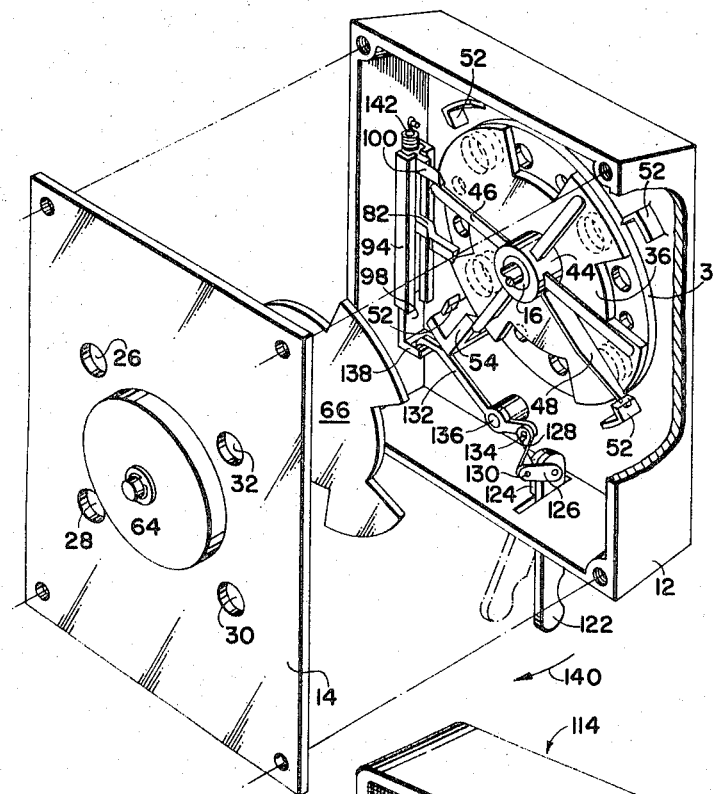

United States Patent Office 3,443,499
Patented May 13, 1969

3,443,499
EXPOSURE CONTROL APPARATUS FOR
PHOTOGRAPHIC CAMERA
Francis T. Gianino, West Roxbury, Mass., assignor to
Polaroid Corporation, Cambridge, Mass., a corporation
of Delaware
Filed Oct. 12, 1966, Ser. No. 586,242
Int. Cl. G03b 37/00
U.S. Cl. 95—18                                   5 Claims

ABSTRACT OF THE DISCLOSURE

A photographic apparatus for causing simultaneous exposure through a plurality of exposure apertures or for causing exposures through the apertures in sequence. A masking blade is mounted on the shaft with the rotary shutter blade and moves in unison with the shutter blade when simultaneous exposures are desired. Sliding the masking blade along the shaft disengages the shutter blade and engages a ratchet. The ratchet prevents the masking blade from moving through more than one aperture at a time.

---

This invention relates to improved photographic apparatus for use with a photographic shutter which simultaneously opens and closes a plurality of exposure apertures. In particular, the apparatus of this invention provides two modes of operation for such a shutter. In operation according to the first mode, simultaneous exposures are produced through all of the apertures and in operation according to the second mode, exposures are produced through the apertures a number at a time in sequence.

In a preferred embodiment of the present invention, an opaque masking member defining a plurality of openings is interposed between the exposure apertures of a photographic camera and the camera film plane. A control device selectively positions the opaque masking member for the first mode of operation by moving the masking member into such relationship with the plurality of exposure apertures that one of the openings defined by the masking member is aligned with each of the exposure apertures. An exposure is thus produced through each of the plurality of exposure apertures in response to a single actuation of the shutter.

The opaque masking member is selectively repositioned for operation according to the second mode wherein exposures are produced through the apertures a number at a time in sequence. For example, the number of apertures through which exposures are produced may be a multiple of the total number of apertures so that exposures are produced through multiples of the apertures, one multiple at a time in sequence. The control device is operated to position the member in uncovering relationship with one multiple of the plurality of exposure apertures and in covering relationship with the remainder of the apertures so that light may pass through the uncovered apertures but not the covered apertures during exposure producing movement of the shutter. Exposures are thus produced only through the uncovered apertures. Subsequent to exposure, the position of the masking member is shifted to cover the multiple of exposure apertures previously uncovered and to uncover a multiple of the plurality of exposure apertures which was previously covered.

An object of this invention is to provide photographic exposure control apparatus for a plural exposure aperture camera by which a plurality of exposures may be produced simultaneously or a number at a time in sequence.

It is also an object to provide in a photographic shutter for substantially simultaneously opening and closing a plurality of exposure apertures, apparatus for establishing two modes of operation wherein simultaneous exposures are produced through each aperture according to a first mode and wherein exposures are produced through the apertures a number at a time in sequence according to a second mode.

It is a further object of this invention to provide in a photographic shutter for substantially simultaneously opening and closing a plurality of apertures, apparatus for establishing two modes of operation wherein an opaque mask having light transmitting regions therein is provided for selective movement into a position for a first mode of operation such that each of the exposure apertures is in alignment with a light transmitting region in the opaque mask to permit the passage of light through each of the apertures upon exposure producing movement of the shutter or for selective movement into one of a plurality of positions for a second mode of operation wherein a number of the exposure apertures are aligned with light transmitting regions in the opaque mask to permit the passage of light through these apertures during exposure producing movement of the shutter and the remainder of the exposure apertures are covered by opaque portions of the mask to prevent the passage of light therethrough during exposure producing movement of the shutter.

It is a further object to provide an attachment for a plural aperture scanning shutter by which, according to a first mode of operation, the plurality of exposure apertures are uncovered to permit the passage of light therethrough during aperture scanning movement of the shutter or by which, according to a second mode of operation, a number of the plurality of exposure apertures are uncovered while the remainder of the apertures are covered so that light passes only through the uncovered apertures during each aperture scanning movement of the shutter and by which the position of the mask is shifted subsequent to each exposure during operation according to the second mode for covering the previously uncovered apertures and for uncovering a number of the apertures which were previously covered.

Other objects of the invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an exploded perspective view of a shutter embodying the masking apparatus of this invention;

FIG. 2 is a perspective view showing the shutter of FIGURE 1 with a portion of the housing removed;

FIG. 3 is a perspective view, partially in section, of a camera back for use with the apparatus of this invention;

Figure 4:
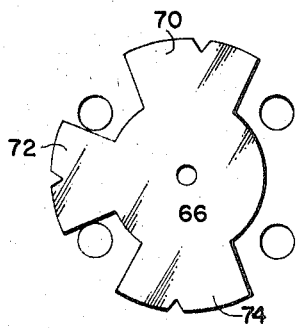
FIG. 4 is a schematic view of a component of the apparatus illustrating one mode of operation.

Reference will now be made to FIGURES 1 and 2 wherein there is illustrated a preferred embodiment of the present invention. The apparatus includes housing 10 which comprises front portion 12 and rear portion 14. Front portion 12 of the housing includes boss 16 which extends from the inside wall thereof part way to rear portion 14 of the housing. Four lens assemblies 18, 20, 22 and 24 are mounted on front portion 12 radially outward of boss 16, and openings 26, 28, 30 and 32 are formed in rear portion 14 in alignment with lens assemblies 18, 20, 22 and 24, respectively.

Boss 16 rotatably supports diaphragm means 34 which is mounted against the inside face of front portion 12 and positioned so that any one of a plurality sets of like sized apertures may be interposed between the lens assemblies and the openings in portion 14, in alignment with the openings and the lens assemblies.

The masking apparatus of this invention may be used in conjunction with the subsequently described shutter disclosed in copending U.S. application in the name of Christopher R. Rice and entitled Photographic Shutter, which is filed concurrently herewith or with other shutters which will substantially simultaneously open and close a plurality of exposure apertures. The shutter illustrated comprises shutter blade 36 and shutter blade rotor 38 mounted on boss 16 rearwardly of diaphragm 34. Four openings 40, corresponding to the four exposure apertures, are formed in blade 36. These openings are interposed between the exposure apertures during the aperture covering position so that the apertures are covered by opaque portions 42 of blade 36. Upon rotation of the blade, one of the four openings will scan each of the four exposure apertures to open and close the same.

Rotor 38 comprises support 44 which has four arms 46 and cantilever spring 48 fixedly extending therefrom. Cantilever 48 is connected to shutter blade 36 by connecting means embodied in pins 50. This connection will allow a small amount of relative rotary movement between rotor 38 and blade 36 due to the resiliency of finger 48 but significant rotation of the rotor will cause exposure producing rotation of shutter blade 36.

Housing 10 supports four abutments 52 and stop 54 which extends into the path of movement of spring finger 48 and arms 46, respectively. Each of the arms 46 have a cam surface 56 and a flat surface 58 which cooperate with cam surface 60 and flat surface 62 of stop 54 to allow the arm to pass the stop in the clockwise direction but not in the counterclockwise direction.

In a preferred embodiment, the masking apparatus of this invention is mounted in housing 10 rearwardly of the shutter means. As shown in the illustration of FIGURES 1 and 2, shaft 64 extends through housing 10 centrally of boss 16 and rotatably supports the masking means which comprises opaque masking member 66 mounted against portion 14 of housing 10. Sleeve 68 is mounted on shaft 64, between rotor 38 and masking member 66, to space the masking member from rotor 38, maintain rotor 38 upon boss 16, and position member 66 against portion 14 of housing 10. Opaque masking member 66 includes light transmitting regions between which are formed opaque portions comprising leaves 70, 72 and 74. Leaves 70 and 74 are of equal size and are arranged upon opposing portions of the member 66. Leaf 72 is smaller than leaves 70 and 74 and extends from member 66 approximately midway therebetween. The leaves are so arranged upon member 66 that it may be selectively positioned to uncover all of the apertures for operation according to a first mode or to cover three of the four exposure apertures for operation according to a second mode.

Indexing means is provided for imparting incremental rotation to the masking member during operation according to the second mode. The indexing means includes ratchet means comprising three projections 76 on member 66, opening 78 in member 66 and projection 80 on shaft 64. The three projections 76 are arranged radially outward from the rotational axis of member 66 and are angularly displaced from opening 78 at approximately equiangular intervals. Projection 80 is of a shape complementary to the shape of opening 78 in member 66. Projection 80 is adapted to move within opening 78, into and out of coplanar relationship with projections 76, in response to the axial movement of shaft 64. The ratchet means operates in conjunction with pawl arm 82.

Masking member 66 is slidably connected to shaft 64 by means of key 84 depending into opening 78 and slot 86 in shaft 64. The key engages the slot so that shaft 64 may move relative to member 66 along the axis of the shaft but relative rotation between the shaft and member 66 is prevented. Thus, rotation of either shaft 64 or the opaque masking member will impart rotation to the other and axial movement of the shaft will move projection 80 relative to projections 76. Shaft 64 is biased by spring 88 into axial position for maintaining projection 80 in coplanar relationship with projections 76.

Means for disenabling the indexing means is provided so that member 66 may be maintained in a single position during operation according to the first mode. In the embodiment of FIGURES 1 and 2 the disenabling means comprises shaft 64, spring 88 and locking means 90. Axial displacement of shaft 64 by depression of button 92, against the bias spring 88, moves projection 80 out of coplanar relationship with projections 76 so that it cannot be engaged by arm 82. Locking means 90, which will subsequently be described in detail, is adapted to releasably hold shaft 64 in such displaced condition.

Channel 94 formed in housing 10 supports actuating means 96 which includes reciprocating slide 98 on which shutter actuator arm 100 and pawl arm 82 are mounted. Arm 100 includes cam surface 102 and flat actuating surface 104 and pawl arm 82 includes cam surface 106 and flat actuating surface 108.

Housing 10 may be mounted upon camera 114 as shown in FIG. 3. The camera includes partitions 116 which divide into four sections both the focal plane of the camera and light shroud 118 which spaces housing 10 from the focal plane. The lens assemblies 18, 20, 22 and 24 are mounted upon housing 10 in alignment with the four sections of the focal plane so that each lens assembly directs illumination upon one section of the focal plane. A single area of photosensitive sheet material 120 at the focal plane is divided into four portions by partitions 116 such that a separate exposure may be formed on each of the four portions thereof.

The following is a description of the operation of the masking apparatus of this invention and the shutter illustrated in FIGURES 1 and 2. Trigger 122 operates a linkage which imparts movement to slide 98 to operate the shutter and to move masking member 66 subsequent to shutter operation. The linkage includes pivotal mounting 124 connecting trigger 122 to portion 12, lever arm 126 attached to trigger 122, link 128 connected to arm 126 by pin 130, lever arm 132 pivotally connected by pin 134 to link 128 and pivotally mounted upon portion 12 by connection 136, and projection 138 on slide 98. Movement of trigger 122 in the direction of arrow 140 causes lever arm 126 to impart movement to link 128 and movement of the link causes arm 132 to pivot about connection 136. Arm 132 engages projection 138 on slide 98 and urges slide 98 in a first direction against the bias spring 142. Release of trigger 122 allows spring 142 to draw slide 98 in a second direction for shifting the position of member 66 and to return the slide and its projection 138, arm 132, the linkage members and trigger 122 to their original positions.

Surface 104 of arm 100 engages an arm 46 on rotor 38 in response to movement of slide 98 in the first direction. Movement of arm 46 rotates hub 44 and thus imparts rotation to the base of spring 48. Rotary movement of spring 48 is initially resisted by engagement of the end of the spring with a first of the plurality of abutments 52. This resistance causes the spring to flex such that energy is stored therein. Flexure reduces the effective length of the spring so that after a predetermined amount of flexure the end thereof escapes the abutment 52. The spring then returns to its relaxed state and releases the stored energy. The force created by the released energy is transferred by pins 50 to shutter blade 36 for imparting aperture scanning rotation thereto.

Rotation of the shutter blade is terminated after approximately one quarter revolution by the engagement of spring 48 with a second of the plurality of abutments 52. Reverse rotation of shutter blade 36 is prevented by stop 54 by which arms 46 may pass in the clockwise direction but not in the counterclockwise direction.

When exposures are to be produced one at a time in sequence, according to the second mode of operation, member 66 is positioned in a single exposure station, one of which is shown in FIG. 4, so that opaque leaves 70, 72 and 74 cover three of the four exposure apertures. Shaft 65 is so positioned by the bias of spring 88 that single projection 80 is in coplanar relationship with the three projections 76. These four coplanar projections are disposed radially of the rotational axis of member 66 and angularly displaced at approximately ninety degree intervals and form four teeth of the ratchet means. This arrangement of the projections allows them to be movably engaged one at a time by pawl arm 82 upon each upward movement thereof.

Actuation of trigger 122 causes the production of an exposure as explained above. Release of the trigger subsequent to exposure causes upward movement of slide 98 due to the bias of spring 142. Surface 108 of pawl arm 82 engages a flat surface 110 of either projection 80 or one of the three projections 76 to move member 66 through a predetermined counterclockwise rotation of approximately ninety degrees, each projection being engaged by arm 82 upon every fourth upward movement thereof. After the predetermined rotation of member 66, the projection engaged by arm 82 moves out of engaging relationship with the arm due to divergence in the arcuate path of the projection from the linear path of arm 82.

Movement of the projection engaged by arm 82 out of engaging relationship with the arm occurs substantially simultaneously with movement of notches 143 in the opaque leaves of member 66 into engagement with detents 144 and 146 by which rotation of member 66 is terminated. Notches 143 on the leaves 70, 72 and 74, together with detents 144 and 146 establish four discrete single exposure positions for masking member 66, in each of which member 66 is releasably held against rotation. For example, in the single exposure position shown in FIG. 5, notch 143 in leaf 70 is engaged by detent 144 while detent 146 remains idle due to the absence of a leaf covering the aperture corresponding to lens assembly 18. Counterclockwise rotation of member 66 to the next single exposure position causes the notch in leaf 74 to be engaged by detent 146 while detent 144 remains idle. In the next single exposure position the notch in leaf 74 is engaged by detent 144 and the notch in leaf 72 is engaged by detent 146. In the fourth single exposure position notches 143 in leaves 72 and 70 are engaged by detents 144 and 146, respeceively.

As member 66 is moved from one single exposure position to the next, leaf 74 of member 66 covers the previously uncovered aperture ad leaf 70 moves out of covering relationship with one of the previously covered apertures. Leaf 72 covers the aperture previously covered by leaf 74 and leaf 70 covers the aperture previously covered by leaf 72.

Arm 100 must move past arm 46 upon upward movement of slide 98. To effect this, cam surface 102 of arm 100 engages cam surface 56 of arm 46 to slightly bend arm 46 as arm 100 moves upward.

Similarly, arm 82 flexes to slide by a projection 76 or projection 80, as the case may be, upon downward movement of slide 98 due to the action of cam surface 106 on arm 82 and cam surfaces 112 on the projections.

From the foregoing, it is apparent that in the second mode of operation actuating means 96 co-ordinates the operation of shutter blade 36 and opaque masking member 66 so that four successive actuations of trigger 122 will cause shutter blade 36 to scan each of the four exposure apertures, in response to each of four downward movements of the actuating means, and cause masking member 66 to move from one of the four single exposure positions to the next such position subsequent to each scanning operation. Four exposures are thus produced one at a time in sequence, one exposure being produced upon each of the four sections of photosensitive material 120 at the focal plane of the camera.

Figure 5:
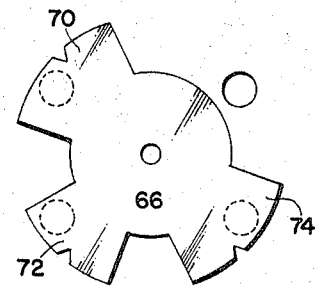
FIG. 5 is a schematic view, similar to FIG. 4, illustrating another mode of operation.

For the first mode of operation, knob 148 is manually rotated to move member 66 to the position shown in FIG. 5 so that each leaf of member 66 is positioned between the exposure apertures rather than in covering relationship with certain of them and projection 80 is moved to such rotary position that it is the only projection subject to engagement by arm 82 upon movement thereof. The spaces between the apertures corresponding to lens assemblies 18 and 24 and lens assemblies 20 and 22 are larger than the spaces between the apertures corresponding to lens assemblies 18 and 20 and lens assemblies 24 and 22. Leaves 70 and 74 may therefore be positioned between the apertures corresponding to lens assemblies 18 and 24 and 20 and 22, respectively, while leaf 72 is positioned between the apertures which correspond to lens assemblies 22 and 24.

Notches 143 are disengaged from detents 144 and 146 when member 66 is positioned for the first mode of operation and do not prohibit rotation of masking member 66. The masking means is releasably held in position for the first mode of operation by locking means 90. Locking means 90 and the means to disenable the indexing means are operated simultaneously as follows. Button 92 is depressed, against the bias of spring 88, to move shaft 64 axially in the direction opposite the direction of arrow 148. Movement of shaft 64 displaces projection 80 with respect to member 66 so that it moves toward cavity 150 in portion 14 of housing 10, out of the path of pawl arm 82. Displacement of shaft 64 causes slot 86 to move relative to key 84 such that a portion of the slot is positioned beneath pivotally mounted member 152 of locking means 90. Member 152 moves into engaging relationship with the slot in response to the biasing action of spring 154. This interlocking engagement holds rod 64, projection 80 and button 92 in the axially displaced position and holds member 66 in rotary position appropriate for the production of simultaneous exposures according to the first mode of operation.

Downward movement of actuating means 96 operates shutter blade 36 as above described. Upward movement of the actuating means does not however impart rotary movement to opaque member 66 since none of the projections of the ratchet means are positioned for engagement by pawl arm 82.

To return to operation according to the second mode, knob 148 is manually rotated counterclockwise to disengage locking means 90. Counterclockwise rotation of knob 148 causes shaft 64 together with member 66 and slot 86 to rotate so that member 152 is urged, against the bias of spring 154, out of slot 86. Stop 156 engages member 152 to prevent movement thereof when a force in the clockwise direction is applied to the shaft. Movement of member 152 out of the slot during rotation of the shaft releases the shaft for axial movement in the direction of arrow 148 so that projection 80 is returned, by the bias of spring 88, to coplanar relationship with projections 76 wherein it is positioned for engagement by arm 82. Masking plate 66 is rotated to the first single exposure position, shown in FIG. 4, wherein the apertures corresponding to lens assemblies 20, 22 and 24 are covered and wherein detent 144 engages notch 143 in opaque leaf 70 while detent 146 remains idle. Axial movement of shaft 64 is sufficient to move slot 86 from member 152 so that it cannot be engaged thereby. Locking means 90 is thus inactive during operation according to the second mode since member 152 must ride on the smooth surface of rod 64 without engaging the same.

Slot 158 in shaft 64 and key 160 on knob 148 cooperate to permit the required relative movement between shaft 64 and knob 148 along the direction of the axis of shaft 64 but prevent relative rotation between knob 148 and the shaft.

Figure 6:
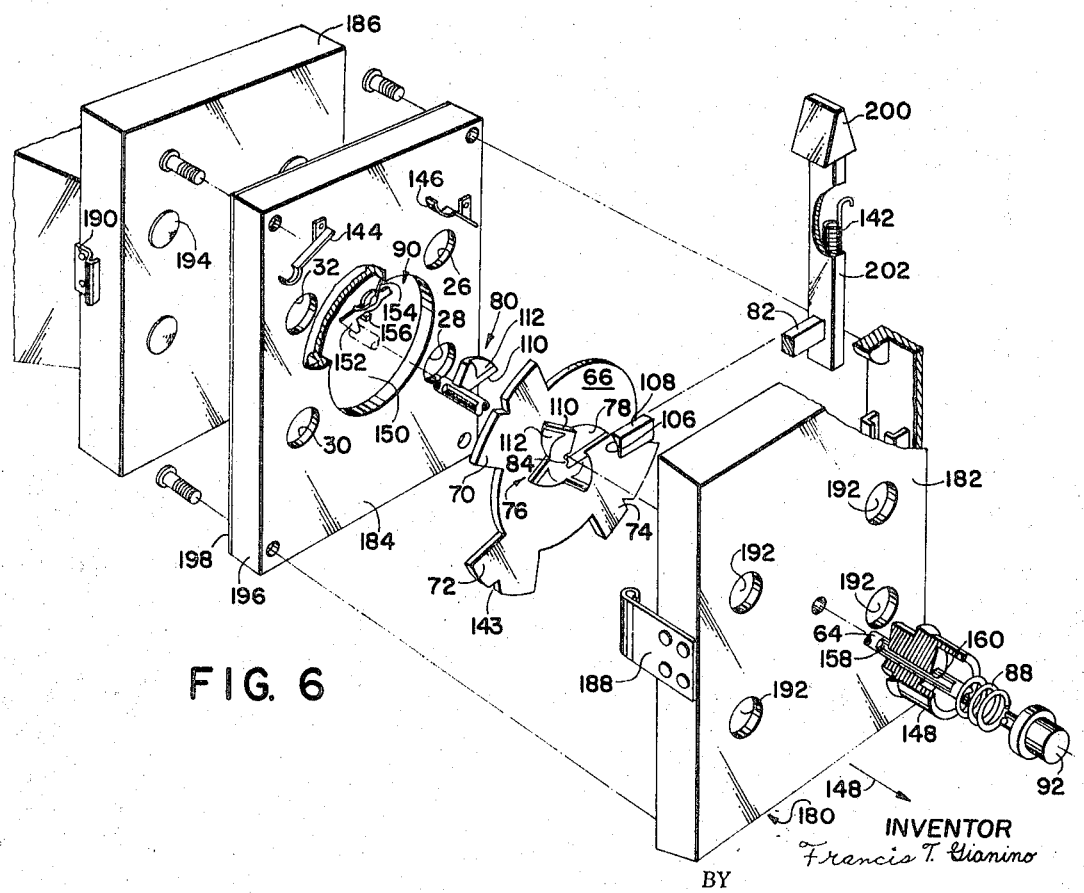
FIG. 6 illustrates an embodiment of the apparatus of this invention in the form of a removable attachment for a photographic shutter.

In the embodiment of FIG. 6, wherein like numerals designate like parts, the masking means forms an attachment for a plural aperture camera shutter.

Housing 180, comprising front portion 182 and rear portion 184, is mounted on the face of shutter housing 186 in any convenient manner. For example, housing 180 may support a spring clip 188 which is designed to engage catch 190 mounted on the shutter housing. Light passageways in the form of openings 192 in front portion 182, and openings 26 through 32 in rear portion 184 of housing 180 are in optical alignment with each other and with lens assemblies 194 and their associated exposure apertures. Rear portion 184 of housing 180 is shaped to conform to the face of shutter housing 186 and side portion 196 thereof spaces cavity 150 from the face of the shutter housing by a distance at least equal to the axial displacement of shaft 64. Side portion 196 is pressed tightly against the surface of shutter housing 186 to form a light seal around lens assemblies 194 and their associated exposure apertures. A gasket designated 198, or the like, may be attached to the edge of portion 196 of the housing to facilitate formation of the light seal. For operation according to the first mode, masking member 66 is moved to the position illustrated in FIG. 5 during exposure producing operation of the shutter. The apparatus and operation thereof for moving the masking member into position for the first mode of operation and for maintaining it in that position are exactly the same as that described for the embodiment of FIGURES 1 and 2.

For operation according to the second mode, the masking apparatus is moved to a first masking position as described in connection with the apparatus of FIGURES 1 and 2. Subsequent to each operation of the shutter to open and close all the apertures, botton 200 is depressed to impart reciprocating movement to slide 202 and pawl arm 82. Pawl arm 82 engages projection 80 or one of the projections 76 in response to each depression of button 200 to index member 66 from one masking station to the next, exactly as in the embodiment of FIGURES 1 and 2.

Thus, with the apparatus of this invention, a plurality of photographic exposures may be produced either simultaneously or one at a time in sequence and the photographic apparatus may conveniently be changed from one type of operation to the other.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. For use with a photographic shutter for producing substantially simultaneous exposures through all of a plurality of exposure apertures, apparatus for selectively changing the mode of operation from the production of simultaneous exposures through all said plurality of apertures to the production of exposures through a lesser number of said plurality of exposure apertures comprising:

(a) masking means defining light transmitting regions and opaque portions mounted for movement into a position for a first mode of operation wherein all of said plurality of exposure apertures are aligned with said light transmitting regions for permitting the passage of light through said apertures during exposure producing operation of said shutter and into any one of a plurality of positions for a second mode of operation wherein opaque portions of said masking means cover a number of said exposure apertures for preventing the passage of light therethrough during exposure producing operation of said shutter and the remainder of said exposure apertures are aligned with said light transmitting regions for permitting the passage of light therethrough during exposure producing operation of said shutter;

(b) means for selectively locating said masking means in position for said first mode of operation or in one of said plurality of positions for said second mode of operation;

(c) indexing means operative, when said masking means is located in any one of said plurality of positions for said second mode, for engaging and moving said masking means subsequent to each exposure from one position for said second mode to another position for said second mode for covering with opaque portions of said masking means said exposure apertures through which exposures are produced with said masking means in said one position and for aligning with said light transmitting regions a number of said apertures covered by said opaque portions of said masking means in said one position; and (d) means for preventing said indexing means from moving said masking means when said masking means is located in said position for said first mode of operation.

2. Apparatus according to claim 1 wherein said exposure apertures are arranged radially of an axis and said masking means is mounted for rotation about said axis for selective movement into position for said first mode of operation and into said plurality of positions for said second mode of operation, said light transmitting regions being arranged for alignment with all of said exposure apertures to permit light to pass therethrough during operation according to said first mode and for alignment with a number of said exposure apertures to permit light to pass through said number of apertures during operation according to said second mode.

3. Apparatus according to claim 2 wherein one of said light transmitting regions of said opaque member is aligned with one of said exposure apertures during operation according to said second mode.

4. Apparatus according to claim 2 including actuating means for operatiing said shutter to make an exposure and wherein said indexing means comprises means coupled with said actuating means for imparting a predetermined rotation to said opaque member in response to movement of said actuating means.

5. For photographic shutter means for producing substantially simultaneous exposures through a plurality of exposure apertures, an attachment for selectively changing the mode of operation from the production of simultaneous exposures through all said apertures to the production of exposures through a lesser number of said apertures comprising:

(a) a housing;
(b) means for mounting said housing upon said shutter means;
(c) means in said housing forming a light passageway for each exposure aperture, each light passageway being positioned for alignment with one of said apertures when said housing is mounted upon said shutter means;
(d) means forming a light seal circumscribing said light passageways and exposure apertures intermediate said housing and said shutter means;
(e) masking means forming opaque portions and light transmitting regions mounted in said housing for movement into a position for a first mode of operation wherein said light transmitting regions are aligned with all of said light passageways in said housing for permitting the passage of light through all of said exposure apertures during exposure producing operation of said shutter means and into any one of a plurality of positions for a second mode of operation wherein opaque portions of said masking means cover a number of said light passageways in said housing for preventing the passage of light through a number of said exposure apertures aligned with said number of covered light passageways during exposure producing operation of said shutter;

(f) means for selectively locating said masking means in position for said first mode of operation or in one of said plurality of positions for said second mode of operation;

(g) indexing means operative, when said masking means is located in any one of said plurality of positions for said second mode for engaging and moving said masking means subsequent to each exposure from one position for said second mode to another position for said second mode for covering with opaque portions of said masking means said exposure apertures through which exposures are produced with said masking means in said one position and for aligning with said light transmitting regions a number of said apertures covered by opaque portions of said masking means in said one position; and (h) means for preventing said indexing means from moving said masking means when said masking means is located in said position for said first mode of operation.

References Cited

UNITED STATES PATENTS

| | | | |
|---|---|---|---|
| 2,860,558 | 11/1958 | Roehrig | 95—18 |
| 3,128,685 | 4/1964 | Kitrosser | 95—18 |
| 3,323,432 | 6/1967 | Rabanit | 95—58 XR |
| 3,345,924 | 10/1967 | Kitrosser | 95—1.1 |

NORTON ANSHER, *Primary Examiner.*

LEO H. McCORMICK, Jr., *Assistant Examiner.*

U.S. Cl. X.R.

95—36, 53